(12) United States Patent
Steinweg et al.

(10) Patent No.: US 9,975,225 B2
(45) Date of Patent: May 22, 2018

(54) TOOL LOCKING MECHANISM

(71) Applicant: Apex Brands, Inc., Sparks, MD (US)

(72) Inventors: Paul Steinweg, Lititz, PA (US);
Hsien-Chung Tuan-Mu, Taichung (TW)

(73) Assignee: Apex Brands, Inc., Sparks, MD (US)

( * ) Notice: Subject to any disclaimer, the term of this patent is extended or adjusted under 35 U.S.C. 154(b) by 710 days.

(21) Appl. No.: 14/466,069

(22) Filed: Aug. 22, 2014

(65) Prior Publication Data

US 2014/0360321 A1 Dec. 11, 2014

Related U.S. Application Data

(63) Continuation of application No. 13/768,335, filed on Feb. 15, 2013, now Pat. No. 8,813,612, which is a continuation of application No. 12/100,908, filed on Apr. 10, 2008, now Pat. No. 8,375,831.

(60) Provisional application No. 60/983,668, filed on Oct. 30, 2007.

(51) Int. Cl.
| | |
|---|---|
| *B25B 23/16* | (2006.01) |
| *B25G 1/00* | (2006.01) |
| *B25G 3/28* | (2006.01) |
| *B25B 23/00* | (2006.01) |
| *B25B 13/46* | (2006.01) |
| *B25G 3/12* | (2006.01) |

(52) U.S. Cl.
CPC .......... *B25B 23/0007* (2013.01); *B25B 13/46* (2013.01); *B25B 23/0035* (2013.01); *B25G 3/12* (2013.01); *B25G 3/28* (2013.01); *Y10T 279/32* (2015.01); *Y10T 403/592* (2015.01); *Y10T 403/7005* (2015.01); *Y10T 403/7026* (2015.01); *Y10T 403/7033* (2015.01)

(58) Field of Classification Search
CPC .... F16D 2001/103; F16D 1/108; F16D 1/112; B25B 23/0007; B25B 23/0035
USPC ................ 81/177.85, 124.3; 403/322.2, 348
See application file for complete search history.

(56) References Cited

U.S. PATENT DOCUMENTS

| | | |
|---|---|---|
| 300,604 A | 6/1884 | Hartman |
| 402,747 A | 5/1889 | Laguire |
| 522,206 A | 7/1894 | Harrison |
| 552,326 A | 12/1895 | Oster |
| 828,026 A | 8/1906 | Garrigus et al. |

(Continued)

OTHER PUBLICATIONS

Lisle Brochure dated Jan. 2003.

(Continued)

*Primary Examiner* — Bryan R Muller
(74) *Attorney, Agent, or Firm* — McNair Law Firm, P.A.

(57) ABSTRACT

A locking mechanism for use with a tool has a tool having a first working end, an opposite second end, a central axis therebetween, and a least one axial recess formed on an outer surface of the tool. A cap is rotatably received on the tool opposite second end, the cap comprising at least one recess formed on an outer surface thereon. The cap is rotatable between a first position in which the cap at least one recess aligns with the tool at least one recess, and a second position in which the cap at least one recess is out of alignment with the tool at least one recess. The locking mechanism further comprises a detent operatively positioned between the tool and the cap. The detent may be a pin and a spring, where the spring biases the cap into the second position.

11 Claims, 14 Drawing Sheets

(56) References Cited

U.S. PATENT DOCUMENTS

| | | | |
|---|---|---|---|
| 828,191 A | 8/1906 | Carmody | |
| 921,518 A | 5/1909 | Dixon | |
| 1,862,225 A | 6/1932 | Lilleberg | |
| 1,953,974 A | 4/1934 | Phillis | |
| 1,999,207 A | 4/1935 | Pealer | |
| 2,004,639 A | 6/1935 | Thewes | |
| 2,145,762 A | 1/1939 | Fox | |
| 2,255,009 A | 9/1941 | Ingwer | |
| 2,592,978 A * | 4/1952 | Trimboli | B25B 15/02 16/429 |
| 3,167,338 A * | 1/1965 | Troike | B25B 23/0035 279/77 |
| 3,608,936 A * | 9/1971 | Karden | F16B 21/12 403/316 |
| 4,087,195 A | 5/1978 | Wood | |
| 4,097,182 A | 6/1978 | Rolnick | |
| 4,213,723 A | 7/1980 | Wagner | |
| 4,308,768 A | 1/1982 | Wagner | |
| 4,606,671 A * | 8/1986 | Rasmussen | F16D 1/06 403/14 |
| 4,752,163 A | 6/1988 | Fedor | |
| 4,799,832 A | 1/1989 | Abbott | |
| 4,856,946 A | 8/1989 | Park | |
| 5,213,347 A | 5/1993 | Rulon et al. | |
| 5,295,422 A | 3/1994 | Chow | |
| 5,299,895 A | 4/1994 | Greenhill | |
| 5,383,673 A | 1/1995 | Mogilnicki | |
| 5,573,357 A | 11/1996 | Mirles | |
| 5,636,851 A | 6/1997 | Kanaan | |
| 5,794,949 A | 8/1998 | Pierce | |
| 5,833,217 A * | 11/1998 | Goldsby | B63B 21/16 254/266 |
| 6,997,654 B2 | 2/2006 | Blick | |
| 7,055,409 B2 | 6/2006 | Hsien | |
| 7,143,669 B2 | 12/2006 | Hu | |
| 7,159,491 B1 | 1/2007 | Chaconas et al. | |
| 2004/0074344 A1* | 4/2004 | Carroll | B25B 13/06 81/121.1 |
| 2004/0217557 A1 | 11/2004 | Wang | |
| 2005/0016333 A1* | 1/2005 | Compton | B23B 31/1071 81/177.85 |

OTHER PUBLICATIONS

General Tool Catalog Brochure for Reversible Ratchet Tap Wrenches.

Office Action dated Mar. 30, 2011 for Taiwan Patent Application No. 097114931.

Office Action dated Aug. 19, 2011 for Taiwan Patent Application No. 097114931.

* cited by examiner

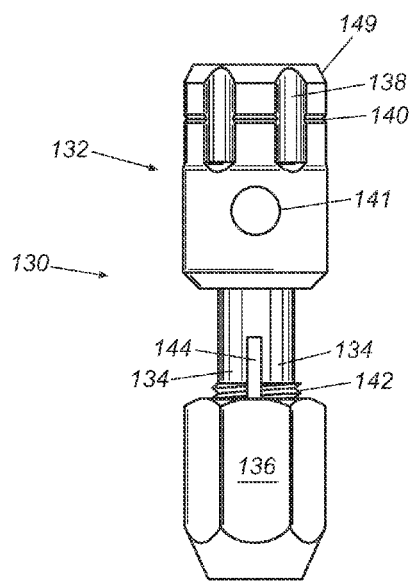 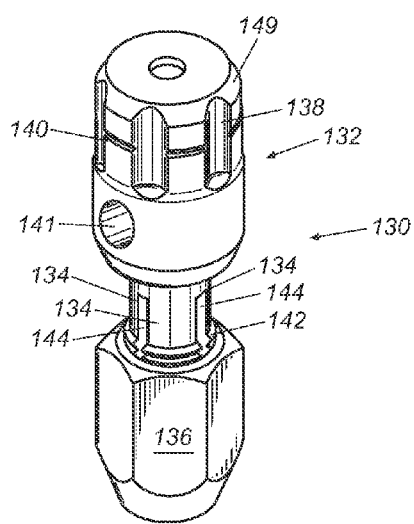
Fig. 2A  Fig. 2B
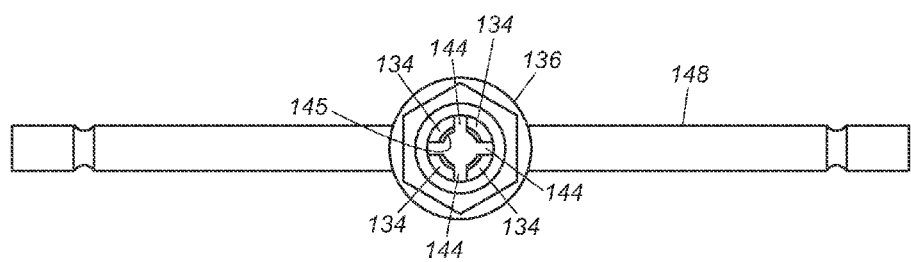
Fig. 2C

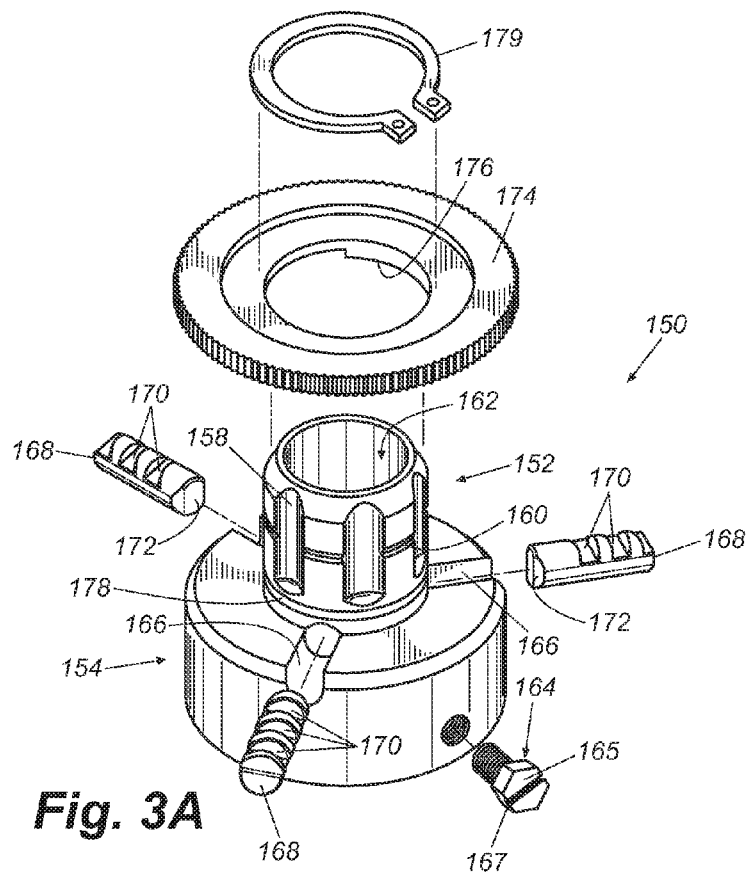
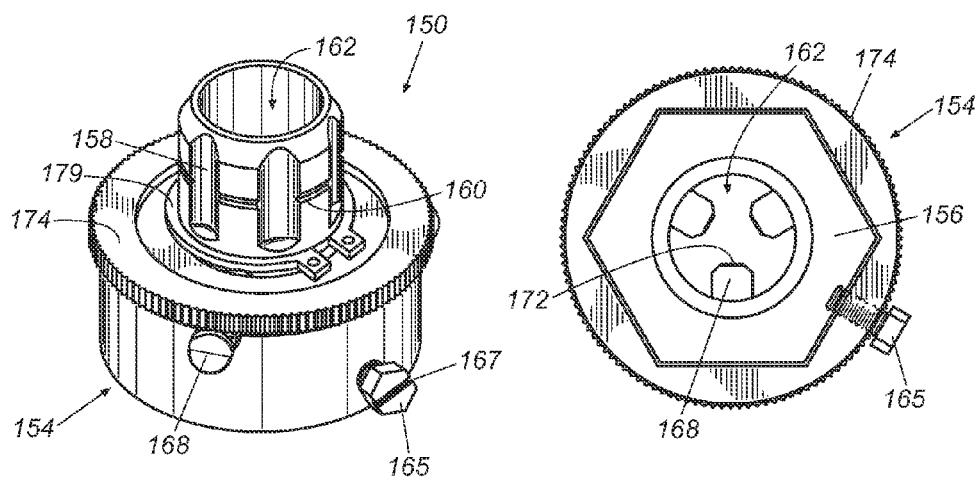
Fig. 3A
Fig. 3B  Fig. 3C

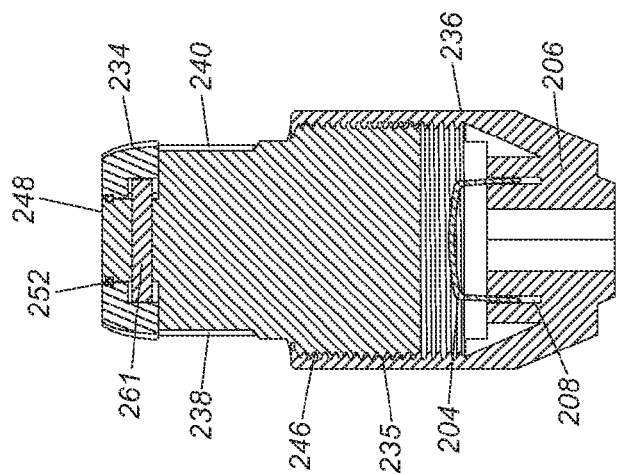
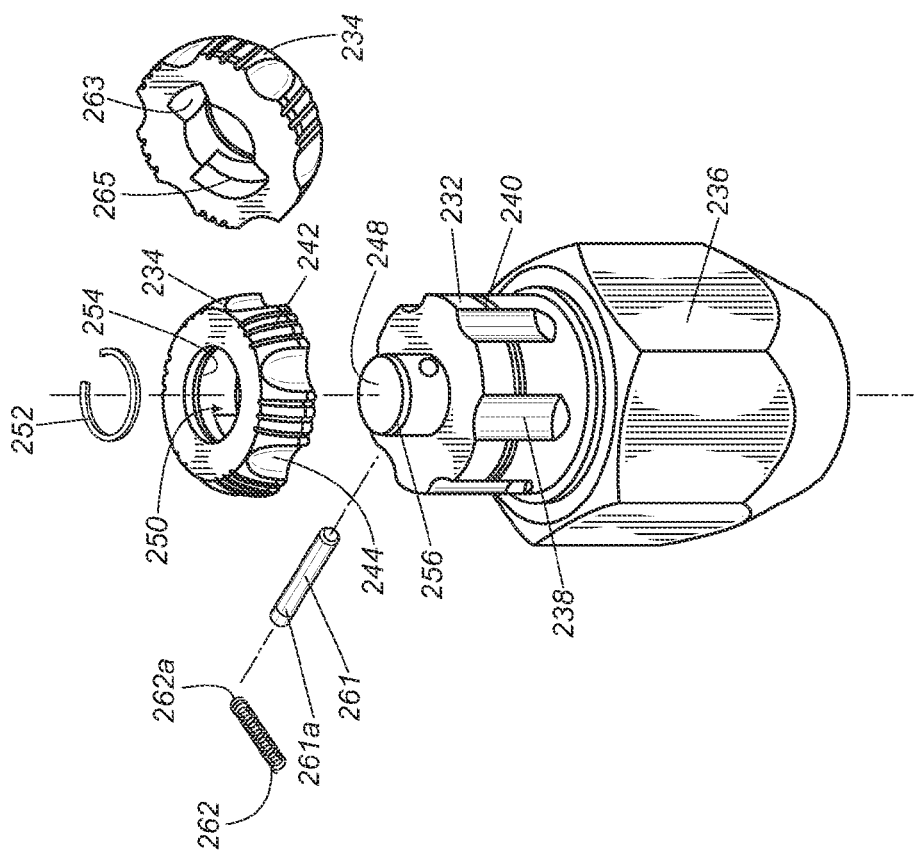

TOOL LOCKING MECHANISM

CLAIM OF PRIORITY

This application is a continuation of U.S. patent application Ser. No. 13/768,335, filed Feb. 15, 2013, now U.S. Pat. No. 8,813,612, which is a continuation of U.S. patent application Ser. No. 12/100,908, filed Apr. 10, 2008, now U.S. Pat. No. 8,375,831, which claims priority to U.S. Provisional Patent Application No. 60/983,668, filed Oct. 30, 2007, which is entitled "Tool Locking Mechanism," the entire disclosures of which are incorporated by reference herein.

FIELD OF THE INVENTION

The present invention relates generally to tools and their associated wrenches. More particularly, the present invention relates to a locking tool mechanism for positively locking a tool in a ratcheting wrench gear ring.

BACKGROUND OF THE INVENTION

Tap and die assemblies for threading holes and elongated shanks, respectively, are well known. Existing tap and die assemblies typically require specialized wrenches for holding and driving the various taps and dies during use. These wrenches are specifically designed for holding a tap or die, and are not adequately suited for use with other tools, such as sockets, socket extensions, etc. Moreover, existing tap and die assemblies require that a separate wrench be used for a tap or a die requiring numerous tools. However, when the tap or die adapter is relatively large and heavy, prior art fasteners such as compression rings are insufficient to retain the adapter in the ratcheting ring of the wrench. Moreover, certain large tools for use with ratcheting wrenches require a positive locking mechanism to retain the tool in the ratcheting wrench.

The accompanying drawings, which are incorporated in and constitute a part of this specification, illustrate one or more embodiments of tool locking mechanism of the present invention.

SUMMARY OF THE INVENTION

The present invention recognizes and addresses the foregoing considerations, and others, of prior art constructions and methods.

These and/or other objects are achieved in a preferred embodiment of a locking mechanism for use with a tool, comprising a tool having a first working end, an opposite second end, a central axis therebetween, and a least one axial recess formed on an outer surface of the tool. A cap is rotatably received on the tool opposite second end, the cap comprising at least one recess formed on an outer surface thereon. The cap is rotatable between a first position in which the cap at least one recess aligns with the tool at least one recess, and a second position in which the cap at least one recess is out of alignment with the tool at least one recess.

In some embodiments, the tool further comprises a plurality of recesses formed thereon. In these and other embodiments, the cap further comprises a plurality of recesses formed thereon. In yet other embodiments, the locking mechanism further comprises a detent operatively positioned between the tool and the cap. In some embodiments, the detent may be a pin and a spring. In other embodiments, the detent may be a spring and a ball. In yet other embodiments, the cap further comprises at least one recess that is operatively engaged by the detent. In these embodiments, the spring is placed intermediate the pin and the cap so that the cap is biased into the second position. In the above embodiments, the cap may be secured to the tool opposite second end by a ring.

In another embodiment, a locking mechanism for use with a tool comprises a tool having a first working end, an opposite second end, a central axis therebetween, a plurality of axial recesses formed on an outer surface of the tool, and a bore formed in the opposite second end transverse to the central axis. A cap is rotatably received on the opposite second end, the cap comprising a plurality of recesses formed on an outer surface thereon and a recess formed in a bottom surface. A pin is positioned in the opposite second end transverse bore and the cap bottom surface recess, and a spring is operatively connected to the cap and at least one end of the pin. The cap is rotatable between a first position in which the plurality of cap recesses aligns with the plurality of tool recesses, and a second position in which the plurality of cap recesses is out of alignment with the plurality of tool recesses. The cap is also biased by the spring into the second position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present tap and die ratchet wrench assembly, including the best mode thereof, directed to one of ordinary skill in the art, is set forth in the specification, which makes reference to the appended drawings, in which:

FIGS. 2A, 2B, and 2C are side, perspective, and bottom views, respectively, of a tap adapter for use with the ratchet wrench shown in FIGS. 1A and 1B;

FIGS. 3A, 3B, and 3C are exploded perspective, perspective, and bottom views, respectively, of a die adapter for use with the ratchet wrench shown in FIGS. 1A and 1B;

FIGS. 19A and 19B are perspective and side views, respectively, of an embodiment of a locking mechanism for use with the ratchet wrench shown in FIGS. 1A and 1B.

Figure 1A:
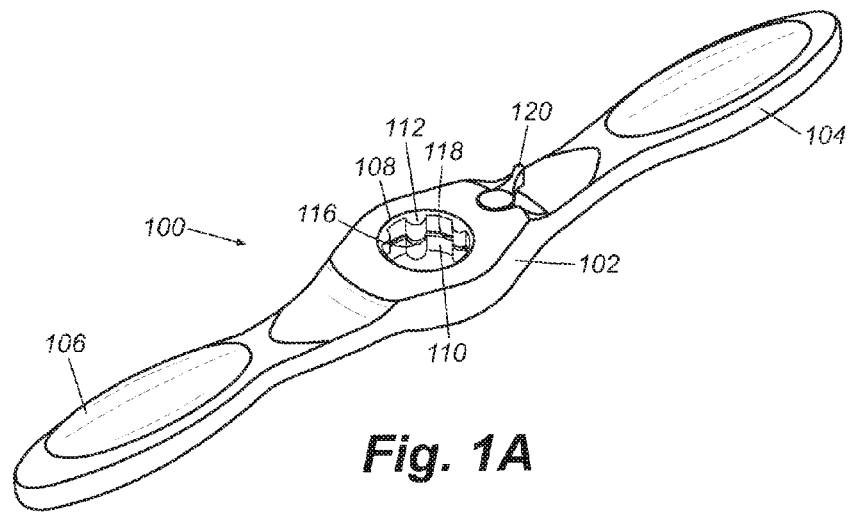
FIGS. 1A and 1B are top perspective and top plan views, respectively, of a ratchet wrench in accordance with an embodiment of the present disclosure.

Repeat use of reference characters in the present specification and drawings is intended to represent same or analogous features or elements of the drill chuck according to the disclosure.

DETAILED DESCRIPTION OF THE
PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1B:
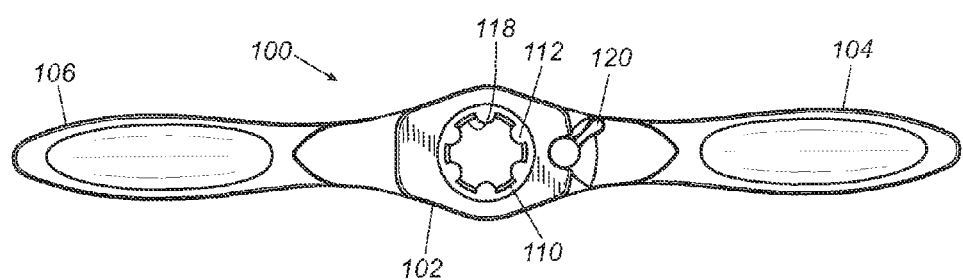
Figure 4:
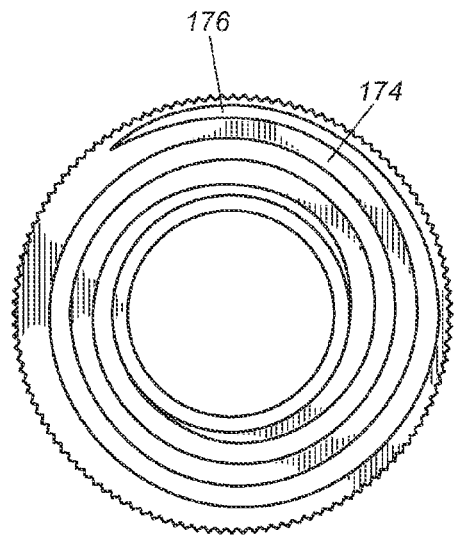
FIG. 4 is a bottom view of an alignment disk of the die adapter shown in FIGS. 3A through 3C.

Referring to FIGS. 1A and 1B, a ratchet wrench 100 has a head portion 102, a first handle 104, and a second handle 106, the first and second handles extending from head portion 102 on opposite sides of head portion 102. A ratchet ring 108 is rotatably received in head portion 102 and includes an inner engaging surface 110 with a plurality of shaped ribs 112 extending inwardly therefrom. In one embodiment, the ribs are semi-cylindrically shaped. However, it should be understood that the ribs may have a triangular, square, oval or any other suitable cross-sectional shape. Each rib 112 includes a slot transverse to the axial direction of the ratchet ring axis and that aligns with the other slots to form a first annular groove 116. First annular groove 116 is configured to receive a ring 118, which may be a continuous pliable ring or a discontinuous spring ring. Ribs 112 and ring 118 are received in corresponding depressions and grooves, respectively, of a work piece, as discussed in greater detail herein.

Ratchet wrench 100 includes a lever 120 that allows a user to select the direction of rotation in which ratchet wrench 100 will apply torque to a work piece and the direction of rotation in which the wrench will ratchet about the workpiece. Lever 120 selectively controls a ratcheting mechanism (not shown) disposed within head portion 102 that engages an outer surface of ratchet ring 108. One example of a suitable ratcheting mechanism is disclosed in U.S. Pat. No. 6,918,323, to Arnold, et al., the disclosure of which is incorporated by reference herein in its entirety.

Referring now to FIGS. 2A through 2C, a tap adapter 130 in accordance with one embodiment of the present invention is shown. Tap adapter 130 includes a barrel portion 132, a plurality of fingers 134 extending axially therefrom, and a threaded nut 136 received on the distal ends of the fingers.

Figure 7:
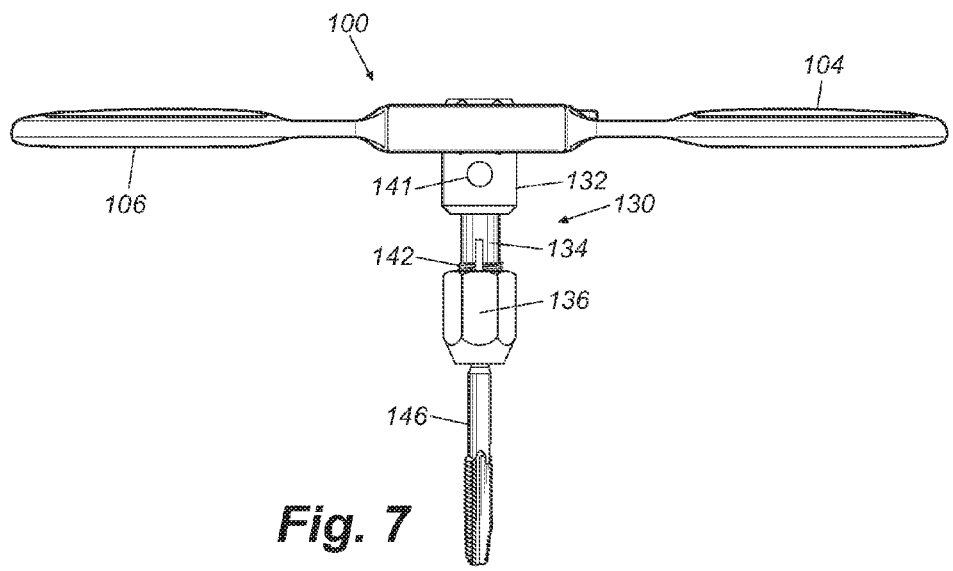
FIG. 7 is a side view of the tap adapter shown in FIGS. 2A through 2C inserted into the ratchet wrench shown in FIGS. 1A and 1B.

Barrel portion 132 includes a set of depressions 138 and a second annular groove 140. As shown, each depression 138 is semi-cylindrical in shape and spaced about barrel portion 132 so that the barrel portion is insertable into ratchet ring 108 (FIG. 7). It should be understood that the shape of depressions 138 should correspond to the shape of ribs 112 so that barrel portion 132 is rotationally secured in ratchet ring 108. A second annular groove 140 is formed in the outer circumference of barrel portion 132 and aligns with groove 116 when barrel portion 132 is inserted into ratchet ring 108. As such, second annular groove 140 is positioned to receive portions of ring 118 to releasably secure tap adapter 130 in ratchet ring 108 in the axial direction, as shown in FIG. 7. A chamfered edge 149 aides in the insertion of the tap adapter into ratchet ring 108.

Barrel portion 132 also includes a transverse bore 141 for slidably receiving a drive dowel 148 as shown in FIG. 2C. As such, tap adapter 130 can be used for threading holes even when a ratcheting wrench is not available. In particular, dowel 148 is slipped through transverse bore 141 so that the dowel extends from opposite sides of barrel portion 132. Next, the user grasps the ends of drive dowel 148 on opposite sides of barrel portion 132 to apply torque in either rotational direction as desired.

Figure 6:
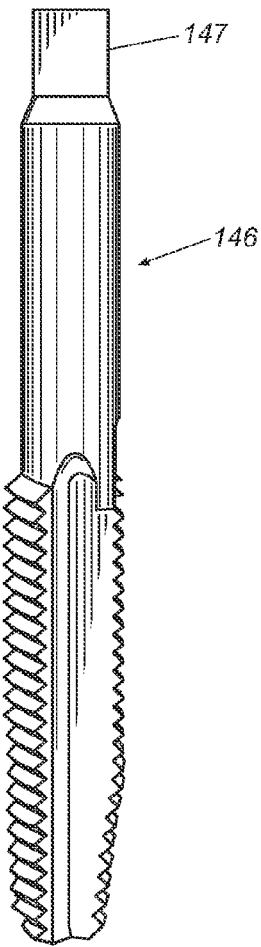
FIG. 6 is a perspective view of a standard tap for use with the tap adapter shown in FIGS. 2A through 2C.

Each finger 134 is separated from adjacent fingers 134 by axial slots 144 and defines a threaded surface 142 at a distal end thereof. As best seen in FIG. 2C, as threaded nut 136 is rotated in a clockwise direction, the distal ends of fingers 134 are biased radially inward until an inner surface 145 of each finger 134 engages a drive boss 147 of a tap 146 (FIG. 6). Threaded nut 136 is further rotated until tap 146 is adequately secured for use. As shown in FIG. 6, tap 146 includes a square drive boss 147. However, inner surfaces 145 of fingers 134 (FIG. 2C) may be configured in any desired fashion so that they properly engage different shaped drive bosses 147. As best seen in FIG. 7, tap adapter 130, with tap 146 secured therein, is secured within ratchet wrench 100 and ready for use. Rotation of threaded nut 136 in a counterclockwise direction (looking up toward the wrench) allows fingers 134 to move radially outward so that the tap can be removed from the tap adapter after use.

Referring now to FIGS. 3A-3C, a die adapter 150 includes a generally cylindrical barrel portion 152 and a generally cylindrical lower portion 154 defining a recess 156 formed therein (FIG. 3C). In one embodiment, recess 156 is hexagonally shaped in cross-section to receive a standard hexagonally shaped die. However, it should be understood that recess 156 may have any desired cross-sectional shape, including circular, square or other polygonal shape, depending on the die adapter's use.

Similar to tap adapter 130, barrel portion 152 includes a set of depressions 158 and a second annular groove 160 formed on an outer circumference. As previously described, depressions 158 and second annular groove 160 are configured such that barrel portion 152 is slidably received and selectively secured in ratchet ring 108, similar to the tap adapter. A continuous axial bore 162 is formed through barrel portion 152 and lower portion 154 to allow passage of a rod, stud, elongated member, etc., therethrough while being threaded by the die. A threaded fastener 164 is threadedly received in a radially extending aperture in lower portion 154 to axially secure a die inserted into recess 156. The fastener can have a polygonal shaped head 165 to allow a user to easily rotate the fastener in the tightening or loosening direction. Alternatively, the head can be knurled for increased gripability and may also define a slot 167 so that the fastener can be tightened with a screw driver.

Die adapter lower portion 154 includes a plurality of radial grooves 166 that extend from the die adapter outer surface into axial bore 162. Each radial groove 166 is configured to slidably receive a corresponding guide pin 168 that includes grooves 170 disposed in its upper surface and an end face 172 proximate axial bore 162. An alignment disk 174 that includes a spiraled land 176 extending downward from its lower surface is located adjacent lower portion 154 so that land 176 is slidably received in grooves 170. Land 176 and grooves 170 are configured such that rotation of alignment disk 174 causes guide pins 168 to be urged radially inward into axial bore 162 or radially outward from axial bore 162, depending on the direction of rotation. As shown, a retainer groove 178, formed in barrel portion 152, receives a C-clip 179 that axially secures alignment disk 174 adjacent lower portion 154. The guide pins are used to center a workpiece being threaded by the die so that the axis of the workpiece is concentric with the axis of the die. As best seen in FIG. 3C, the side edges of each guide pin's end face 172 are beveled so that the end faces 172 may be used to engage workpieces having relatively small diameters.

Figure 5:
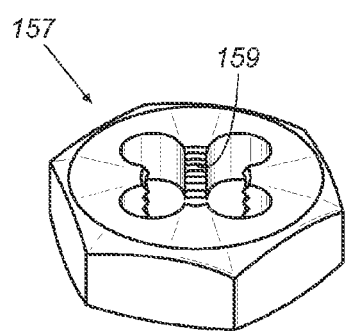
FIG. 5 is a perspective view of a standard die for use with the die adapter shown in FIGS. 3A through 3C.

To use die adapter 150, a user selects a desired die 157 (FIG. 5), places the die in recess 156 and secures it therein by engaging die 157 with threaded fastener 164. Once the die is secured in the adapter, die adapter barrel portion 152 is inserted into ratchet ring 108. Die adapter 150 can accommodate elongated members (not shown) having diameters approaching the diameter of axial bore 162. As best seen in FIG. 3C, depending upon the diameter of the elongated member to be threaded, it may be necessary to rotate alignment disk 174 to retract guide pins 168 from axial bore 162 so as not to impede passage of the elongated member therethrough as the die threads the elongated member. For example, the user engages a free end of the elongated member with die threaded projections 159 (FIG. 5) and rotates ratchet wrench 100. As ratchet wrench 100 is rotated, the leading thread of each threaded projection 159 bites into the material of the elongated member and cuts a thread into the outer circumference of the elongated member. Continued rotation of ratchet wrench 100 about the elongated member causes subsequent threads on each threaded projection to follow in the threads previously formed on the elongated member by the proceeding threads on each threaded projection 159. As such, ratchet wrench 100 is drawn downwardly along the length of the elongated member such that the elongated member begins to extend and move through axial bore 162. Once the leading end of the elongated member is adjacent guide pins 168, alignment disk 174 may be rotated clockwise to urge guide pins 168 inwardly until their end faces 172 abut the elongated member. As such, guide pins 168 serve as points of contact to help maintain the concentric orientation of ratchet wrench 100, die 157 and the elongated member.

Figures 8A, 8B:
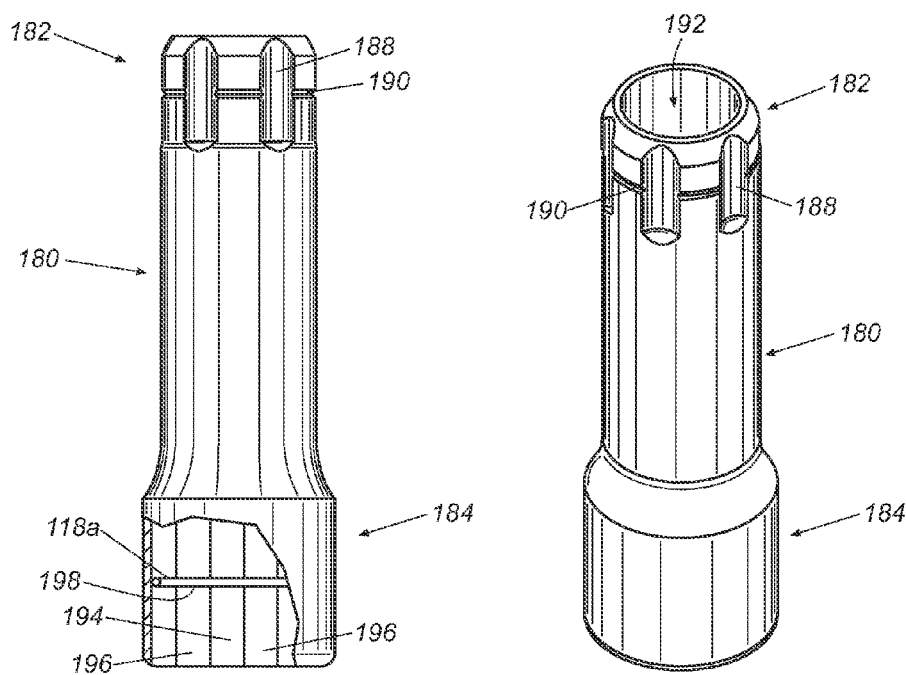
FIGS. 8A and 8B are a partial cut-away side and perspective view, respectively, of an extension for use with the ratchet wrench as shown in FIGS. 1A and 1B.

Referring now to FIGS. 8A and 8B, an extension 180 for use with ratchet wrench 100, tap adapter 130, and die adapter 150 includes a generally cylindrical barrel portion 182 and a receptacle end 184. Similar to barrel portion 132 of tap adapter 130, barrel portion 182 includes a plurality of depressions 188 and a second annular groove 190. Depressions 188 and second annular groove 190 are configured to receive ribs 112 and ring 118 of ratchet ring 108, respectively. Similar to ratchet ring 108, receptacle end 184 includes an inner engaging surface 194 with a plurality of ribs 196 extending inwardly therefrom. The ribs are preferably shaped to fit into the depressions formed in the tap and die adapters, and in one embodiment the ribs are semi-cylindrical in shape. Each rib 196 includes a slot, the slots being aligned so as to form an annular groove 198 that receives a ring member 118a. Additionally, extension 180 includes an axial bore 192 extending therethrough. Extension 180 may be used to secure both tap adapter 130 and die adapter 150 to ratchet wrench 100. Bore 192 allows the elongated member to pass through extension 180 when used with the die adapter.

Figure 9:
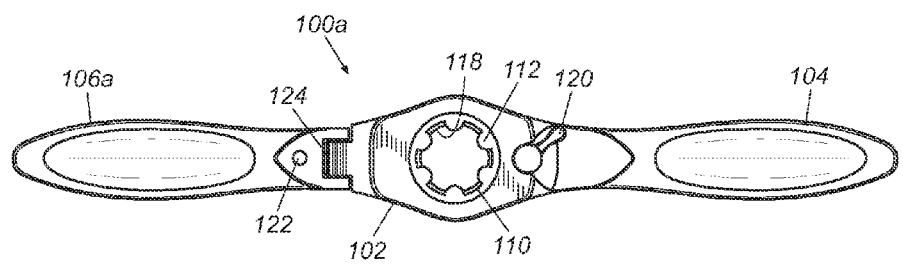
FIG. 9 is a top view of an embodiment of a ratchet wrench in accordance with the present disclosure.

Referring now to FIG. 9, an alternate embodiment of a ratchet wrench 100a is constructed similarly to ratchet wrench 100 shown in FIGS. 1A and 1B, with the additional element of a pivotally mounted handle 106a. Handle 106a is pivotally mounted to head portion 102 and locked into place by a detent 122 that a user operates to selectively engage a plurality of teeth 124 formed on head portion 102. In one embodiment, detent 122 includes a ball and spring (not shown) that is housed in a bore (not shown) formed in the handle end adjacent teeth 124. The spring biases the ball outward into engagement with teeth 124 to lock the handle into position. A button in the handle is in operative engagement with the spring and ball such that when the button is depressed, the ball can be urged into the bore against the outward bias of the spring so that the handle can be pivoted to the desired position, at which time the user releases the button and allows the ball to re-engage the plurality of teeth 124. This feature is desirable when tap and die operations are being conducted in areas of limited accessibility. It should be understood that other forms of detents may be used for example, a spring that biases a ball or pin into engagement with teeth 124.

Figure 10A:
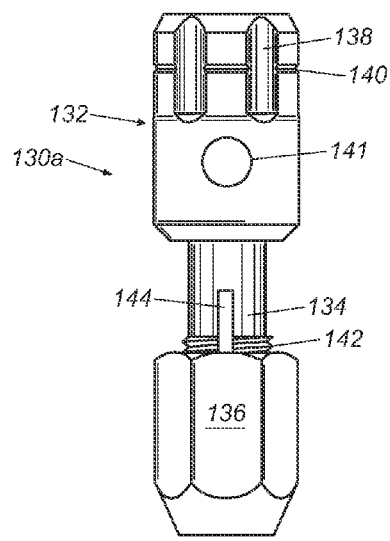
FIGS. 10A and 10B are side and top perspective view, respectively, of an embodiment of a tap adapter for use with the ratchet wrench shown in FIGS. 1A, 1B and FIG. 9.
Figure 10B:
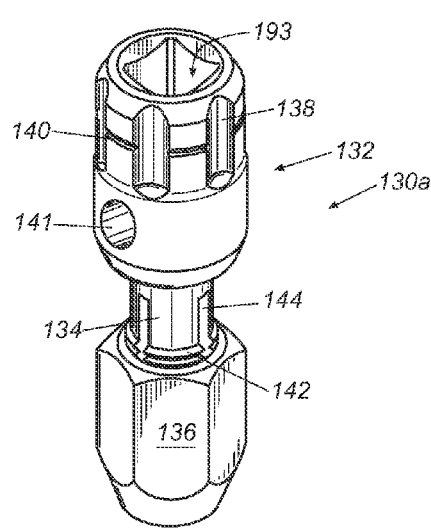

Referring now to FIGS. 10A and 10B, an alternate embodiment of a tap adapter 130a in accordance with the present invention is constructed similarly to tap adapter 130 shown in FIGS. 2A through 2C, with the exception that a square receiver 193 is formed in the upper surface of barrel portion 132 and is configured to receive a square drive tang of a standard ratchet wrench. As such, tap adapter 130a can be used with standard ratchet wrenches as well as ratchet wrenches according to the present invention. It should be understood that die adapter 150 may also be formed with a square receiver to allow the tie adapter to be used with a standard ratchet wrench.

Figure 11A:
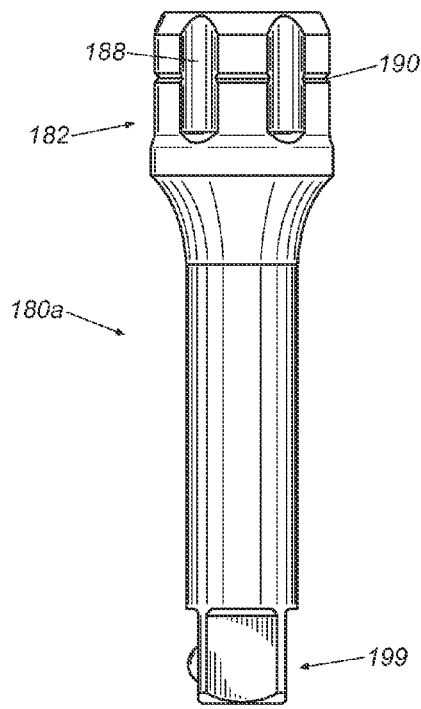
FIGS. 11A and 11B are side and perspective views, respectively, of an embodiment of an extension for use with the tap adapter shown in FIGS. 10A and 10B.
Figure 11B:
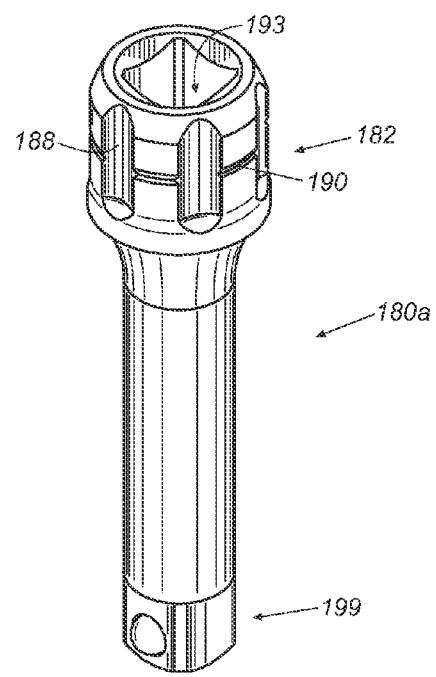

Referring now to FIGS. 11A and 11B, an alternate embodiment of an extension 180a in accordance with the present invention is disclosed. Extension 180a includes a barrel portion 182 with a plurality of depressions 188 and a second annular groove 190 formed therein. A square receiver 193 is formed in an upper surface of barrel portion 182. As such, extension 180a can be used with both standard ratchet wrenches having square drive tangs as well as ratchet wrenches in accordance with the present invention. Extension 180a also includes a square drive boss 199 opposite barrel portion 182. This permits extension 180a to be used with tap adapter 130a shown in FIGS. 10A and 10B as well as standard socket sets having square receivers.

Figure 12A:
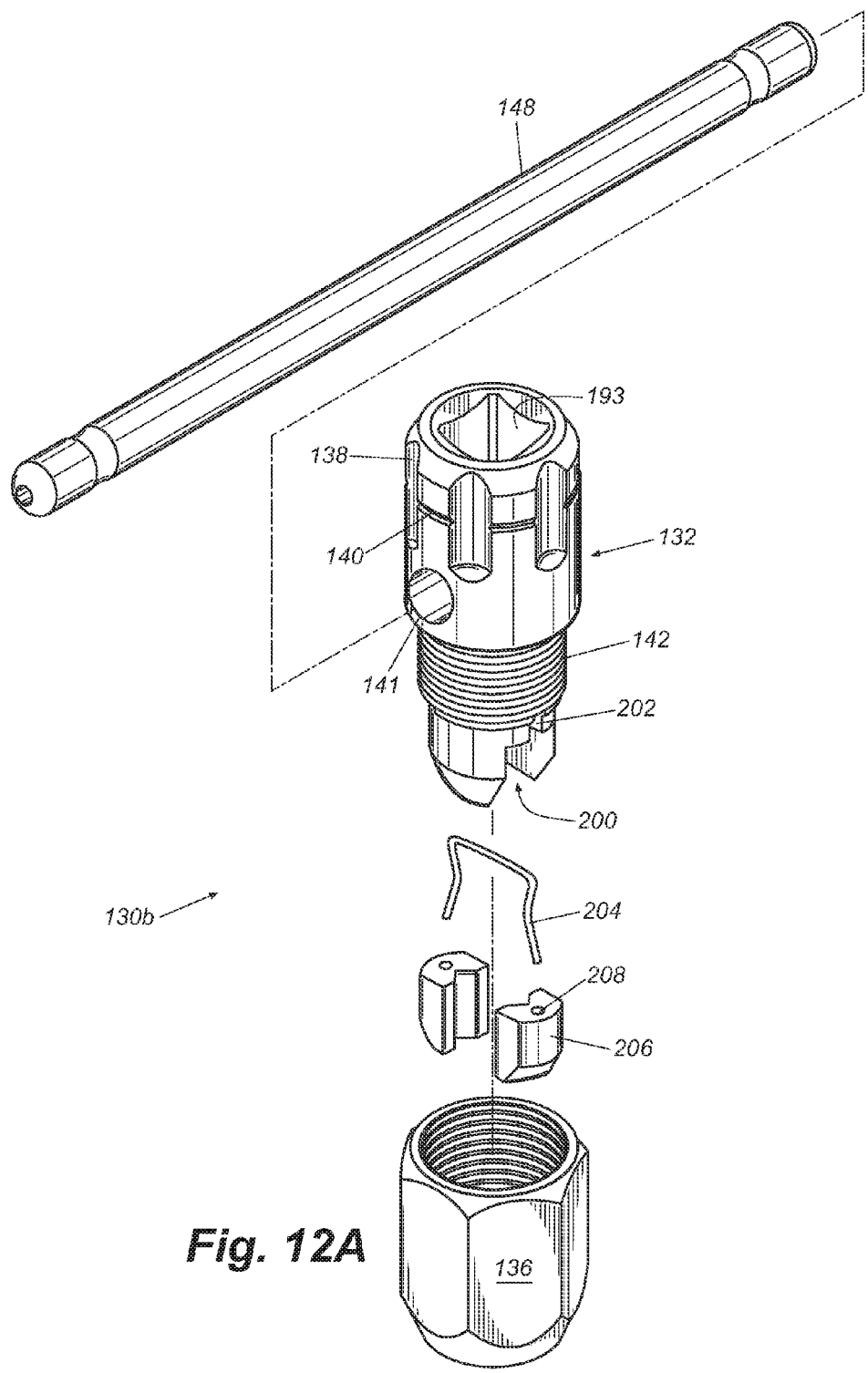
FIGS. 12A, 12B, and 12C are exploded perspective, perspective, and bottom views, respectively, of an embodiment of a tap adapter for use with the ratchet wrench shown in FIGS. 1A, 1B and FIG. 9.
Figure 12B:
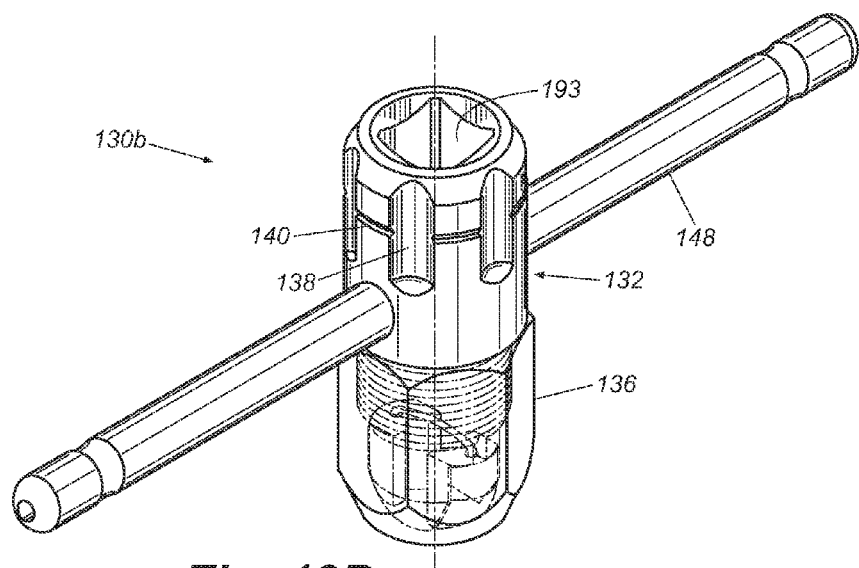
Figure 12C:
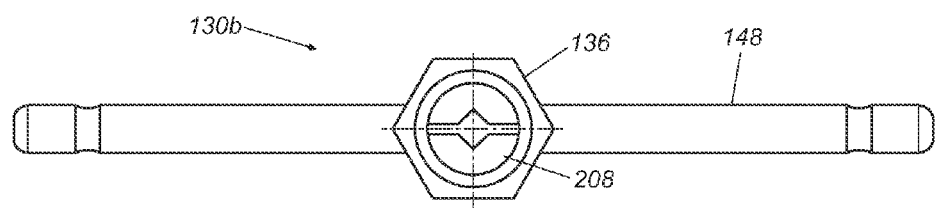
Figure 13:
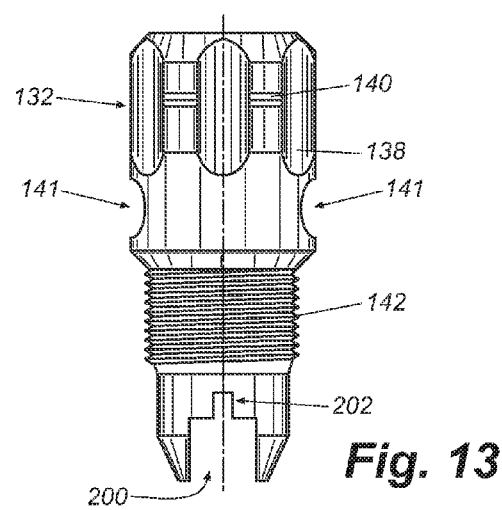
FIG. 13 is a side view of the tap adapter body shown in FIGS. 12A-12C.

Referring now to FIGS. 12A-12C, an alternate embodiment of a tap adapter 130b is shown with first and second transverse grooves 200 and 202, respectively, formed in the end opposite barrel portion 132. Second transverse groove 202 receives a base portion of a U-shaped spring 204. A pair of gripping blocks 206, slidably disposed in first transverse groove 200, each have an aperture 208 for receiving one of the spring's free ends and an inner face for engaging tap drive boss 147 (FIG. 6). Thus, as threaded nut 136 is rotated with respect to tap adapter 130*b*, an inner surface of nut 136 acts on the beveled forward end of each gripping block 206 urging the blocks inwardly against the outward bias of the spring into engagement with the tap. Note, tap adapter 130*b* can be shortened by omitting optional transverse bore 141 (FIG. 13).

Figure 16:
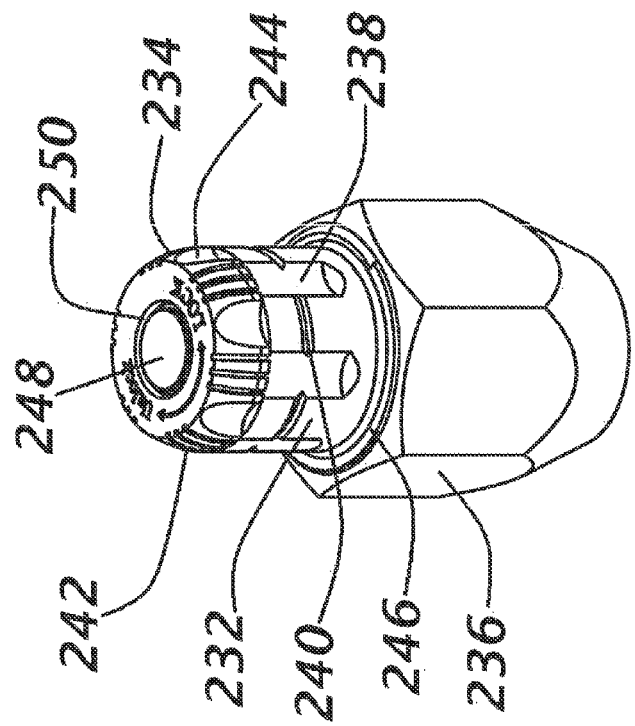
FIG. 16 is a side perspective view of the tap adapter of FIG. 14.
Figure 14:
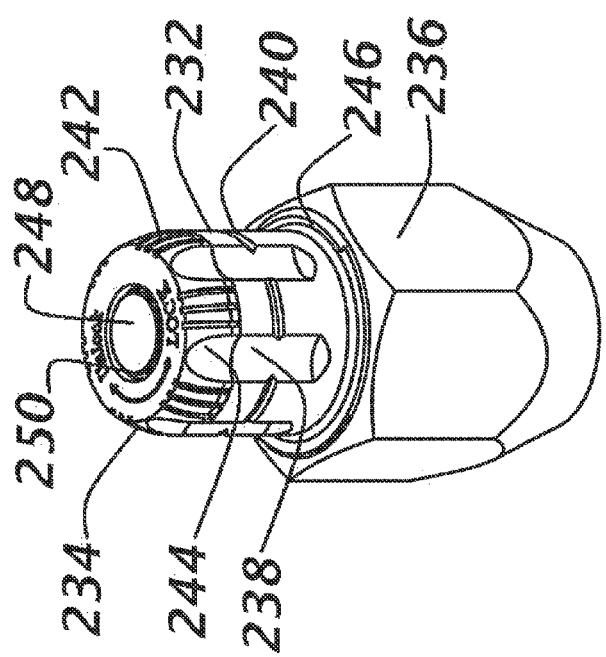
FIG. 14 is perspective a view of an embodiment of a tap adapter for use with the ratchet wrench shown in FIGS. 1A and 1B.
Figure 15:
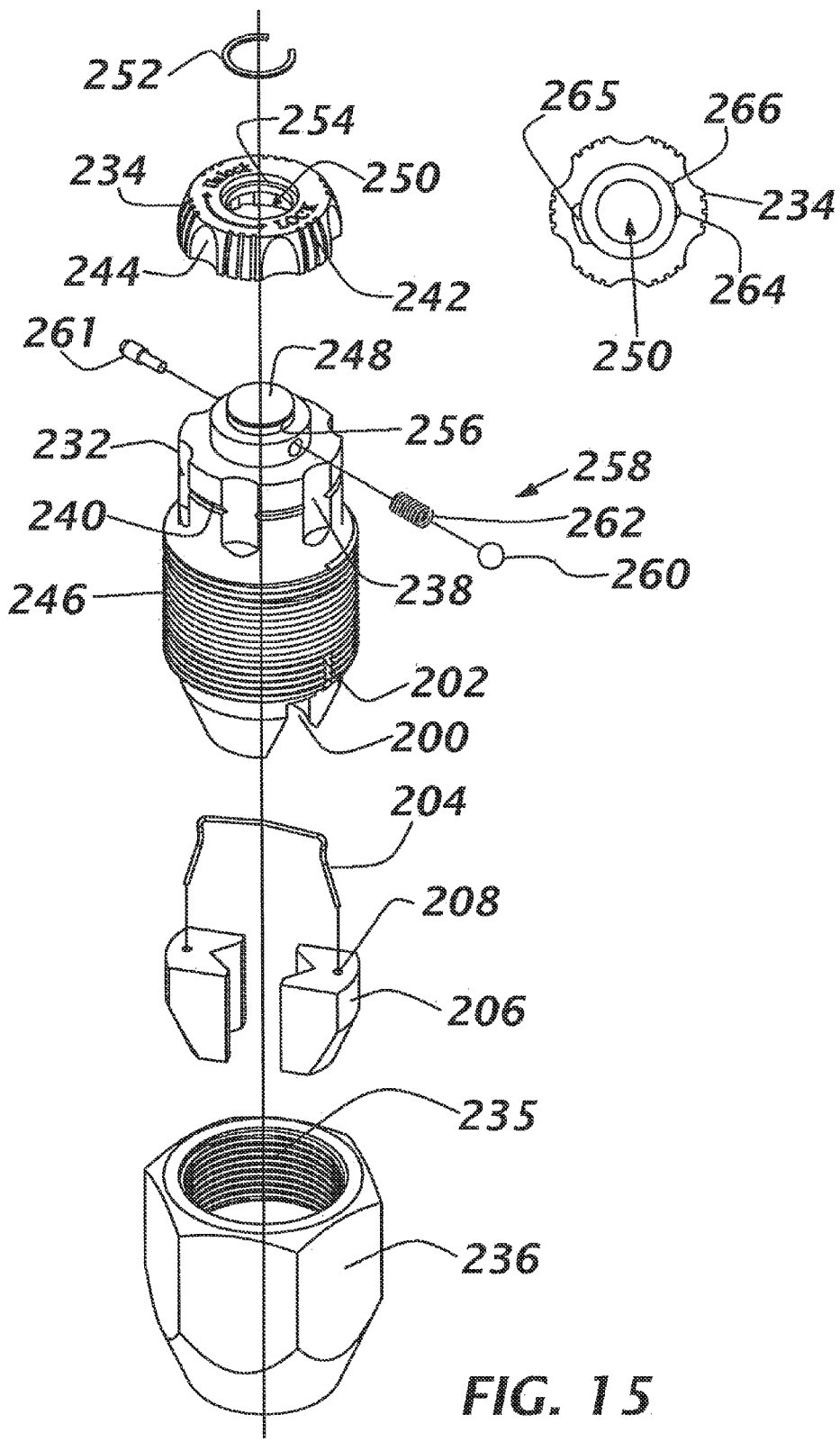
FIG. 15 is an exploded perspective view of the tap adapter of FIG. 15.

Referring now to FIGS. 14-16, a tap adapter 230 is shown having a locking mechanism of the present invention. Tap adapter 230 includes a barrel portion 232 shown with first and second transverse grooves 200 and 202, respectively, formed in one end. Second transverse groove 202 receives a base portion of a U-shaped spring 204. A pair of gripping blocks 206, slidably disposed in first transverse groove 200, each have an aperture 208 for receiving one of the spring's free ends and an inner face for engaging tap drive boss 147 (FIG. 6). Thus, as threaded nut 236 is rotated with respect to barrel portion 232, an inner surface of nut 236 acts on the beveled forward end of each gripping block 206 urging the blocks inwardly against the outward bias of the spring into engagement with the tap.

Barrel portion 232 includes a set of depressions 238 and a second annular groove 240. As shown, each depression 238 is semi-cylindrical in shape and spaced about barrel portion 232 so that the barrel portion is insertable into ratchet ring 108 (FIG. 7). It should be understood that the shape of depressions 238 should correspond to the shape of ribs 112 so that barrel portion 232 is rotationally secured in ratchet ring 108. Second annular groove 240 is formed in the outer circumference of barrel portion 232 and aligns with groove 116 when barrel portion 132 is inserted into ratchet ring 108. As such, second annular groove 240 is positioned to receive portions of ring 118 held in ratcheting ring 108. A cap 234 is rotatably received on an opposite end of barrel portion 232 distal from threaded nut 236. Cap 234 has sloped sides 242 that define a set of depressions 244 that are annularly positioned to align with depressions 238. Sloped sides 242 aides in the insertion of the tap adapter into ratchet ring 108.

Referring to FIG. 15, cap 234 is rotatably received on an end of barrel portion 232 so that it can rotate with respect to the barrel portion to align recesses 238 and 244. In one embodiment, cap 234 is received on a pin 248 and held in place by a ring 252 received in a groove 254 formed in a wall defining an opening 250 in cap 234. Ring 252 abuts a radially extending flange 256 formed at an end of pin 248. A detent 258 is positioned intermediate cap 234 and pin 248 in a bore formed through pin 248. In one embodiment, detent 258 is a ball 260, a spring 262 and a pin 261 that function to retain cap 234 in a first position (FIG. 18) where recesses 238 align with recesses 244 and a second position (FIG. 17) where recesses 238 are misaligned with recesses 244. Ball 260 operatively engage two recesses 264 and 266 formed in an inner circumferential wall of cap 234 and pin 261 is operatively received in a recess 265 also formed in cap 234.

In an alternate embodiment, pin 248 may be formed with a threaded bore (not shown) formed therein. A disk having a threaded stem (not shown) may be threadably engaged with the pin's threaded bore so that the disk engages cap flange 256 to retain the cap on the barrel portion. Cap 234 may be rotatably secured to barrel portion 232 by rivet, screw or other types of fasteners that allow the cap to rotate with respect to the barrel portion. In other embodiments, detent 258 may be formed by spring 262 and a ball or pin (not shown). Still in other embodiments, the detent may be positioned between cap 234 and the end of barrel portion 232 in a similar manner to that explained above.

Figure 17:
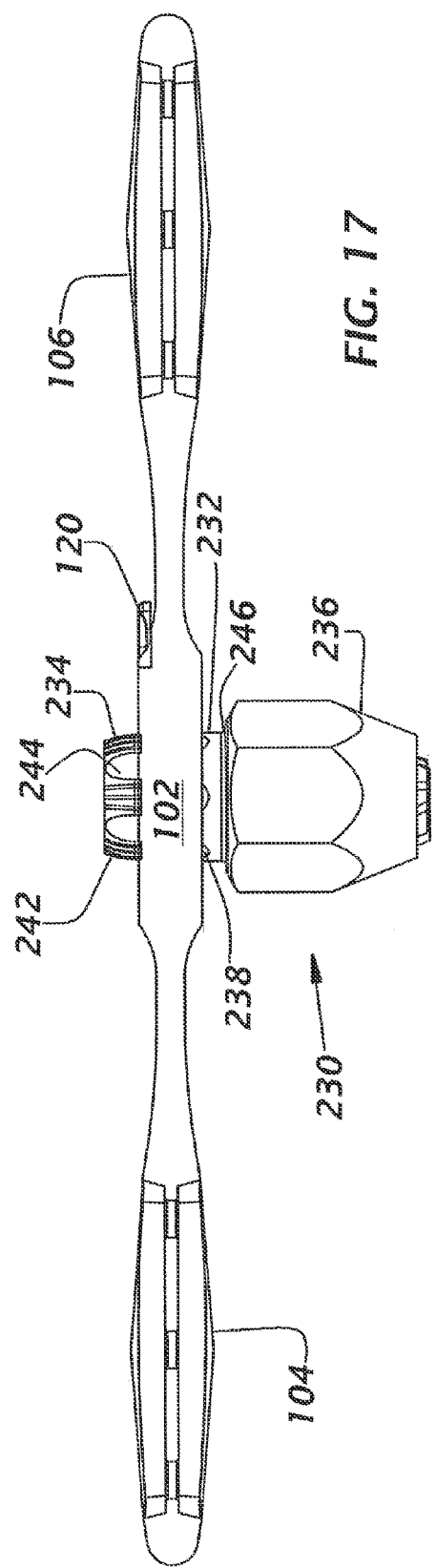
FIG. 17 is a perspective view of the tap adapter of FIG. 14 inserted into the ratchet wrench of FIGS. 1A and 1B.
Figure 18:
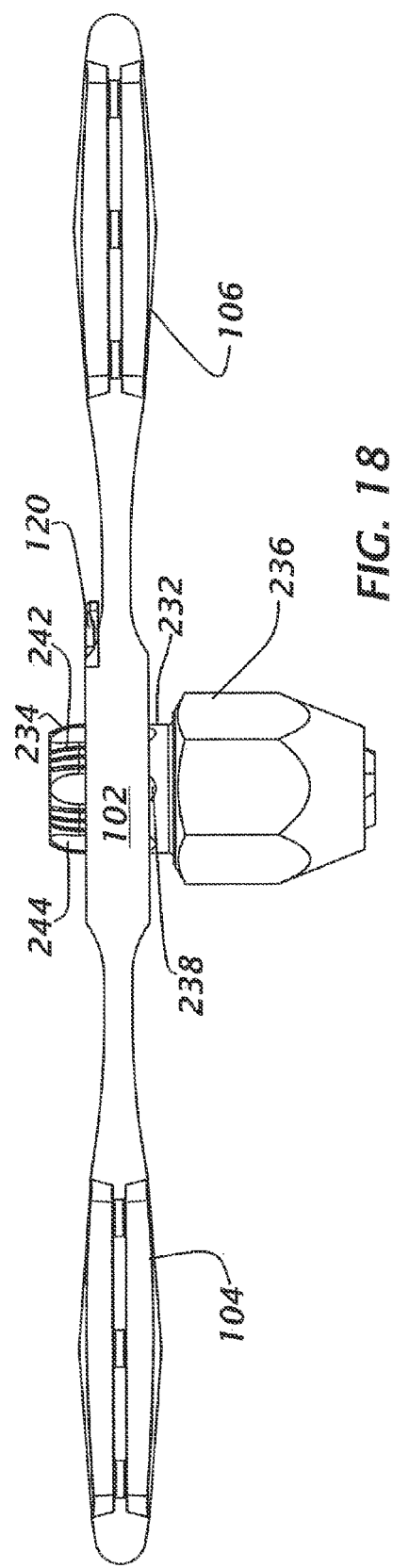
FIG. 18 is a perspective view of the tap adapter of FIG. 14 inserted into the ratchet wrench of FIGS. 1A and 1B.

Referring to FIGS. 17 and 18, in operation tap adapter 230 is placed through socket ring 108 until cap 234 extends outside the socket ring. In some embodiments, ring 118 will engage groove 240 when the tap adapter is fully engaged in the socket ring. In other embodiments, ring 118 and groove 240 may be eliminated. Once the tap adapter is fully received in the socket ring (FIG. 18), the user rotates cap 234 with respect to barrel portion 232 to move detent 258 from one of recesses 264 and 266 to the other of recesses 264 and 266, thereby locking the cap in the second position where recesses 238 and 244 are misaligned. In this position (FIG. 17), the tap adapter is positively locked in the socket ring and cannot be removed until the cap is rotated back into the first position. In either the first or second position, the detent retains the cap and prevents it from rotating with respect to the barrel portion.

Referring to FIGS. 19A and 19B, another embodiment of a locking mechanism is shown. The adapter includes a barrel portion 232 shown with first and second transverse grooves 200 and 202 (FIG. 15), respectively, formed in one end. Second transverse groove 202 receives a base portion of a U-shaped spring 204. A pair of gripping blocks 206, slidably disposed in first transverse groove 200, each have an aperture 208 for receiving one of the spring's free ends and an inner face for engaging tap drive boss 147 (FIG. 6). Thus, as threaded nut 236 (FIG. 19B) is rotated with respect to barrel portion 232, an inner surface of nut 236 acts on the beveled forward end of each gripping block 206 urging the blocks inwardly against the outward bias of the spring into engagement with the tap.

Barrel portion 232 includes a set of depressions 238 and a second annular groove 240. As shown, each depression 238 is semi-cylindrical in shape and spaced about barrel portion 232 so that the barrel portion is insertable into ratchet ring 108 (FIG. 7). It should be understood that the shape of depressions 238 should correspond to the shape of ribs 112 so that barrel portion 232 is rotationally secured in ratchet ring 108. Second annular groove 240 is formed in the outer circumference of barrel portion 232 and aligns with groove 116 (FIG. 1A) when barrel portion 232 is inserted into ratchet ring 108. As such, second annular groove 240 is positioned to receive portions of ring 118 (FIG. 1A) held in ratcheting ring 108. A cap 234 is rotatably received on an opposite end of barrel portion 232 distal from threaded nut 236. Cap 234 has sloped sides 242 that define a set of depressions 244 that are annularly positioned to align with depressions 238. Sloped sides 242 aides in the insertion of the tap adapter into ratchet ring 108.

Cap 234 is rotatably received on an end of barrel portion 232 so that it can rotate with respect to the barrel portion to align recesses 238 and 244. In one embodiment, cap 234 is received on a pin 248 and held in place by a ring 252 received in a groove 254 formed in a wall defining an opening 250 in cap 234. Ring 252 abuts a radially extending flange 256 formed at an end of pin 248. A detent 261 is positioned intermediate cap 234 and pin 248 in a bore formed through pin 248. A first end 261*a* of detent 261 is received in a recess 265 and the opposite end is received in a second cap recess 263. A spring 262 is also received in cap recess 265, wherein a first spring end 262*a* is operatively coupled to first pin end 261*a*. In this configuration, spring 262 biases cap 232 into a second position (FIG. 17) where recesses 238 are out of alignment with recesses 244. Thus, to align recesses 238 with recesses 244, cap 234 is rotated clockwise against the tensile force of the spring so that the tool can be removed from the ratchet wrench ring. Once cap 234 is in a first position where the recesses align, the tool can be pushed out of the ring so that cap 234 is allowed to move back into the locked second position by spring 262. In other embodiments, instead of pulling the cap into the locked first position, the spring can bias the cap into the locked second position by pushing pin end 261 within cap recess 265.

It should be understood that the arrangement described above for positively locking the tap adapter in the socket ring may be used with other types of adapters, socket and tools that are received in a socket ring, as described herein. For example, the described cap may be used in the corresponding die adapter. Additionally, the locking mechanism can be used with tools such as sockets and adapters for positively locking the socket or adapter into socket ring 108 preventing removal of the tool until cap 234 is rotated to the first position where recesses 238 and 244 are aligned.

While one or more preferred embodiments of the invention are described above, it should be appreciated by those skilled in the art that various modifications and variations can be made in the present invention without departing from the scope and spirit thereof. For example, the tap and die adapters can be used with non-ratcheting wrenches. As well, the correspondingly shaped ribs and depressions may be formed with various cross-sectional shapes, such as, but not limited to, triangular, square, rectangular, trapezoidal, etc. It is intended that the present invention cover such modifications and variations as come within the scope and spirit of the appended claims and their equivalents.

What is claimed is:

1. A tool assembly, comprising:
   a. a tool having,
      a first working end,
      an opposite second end,
      a central axis therebetween,
      at least one axial recess formed on an outer surface of the tool, and a bore formed in the opposite second end transverse to the central axis;
   b. a cap rotatably received on the opposite second end, the cap comprising at least
      one recess formed on an outer surface thereon, a cap bottom surface recess formed in a bottom surface of the cap facing the tool, a first detent recess formed in an inner wall of the cap, and a second detent recess formed in the inner wall of the cap; and
   c. a detent partially disposed within the bore with a first end of the detent extending into the cap bottom surface recess;
   wherein the cap is rotatable between
      a first position in which the at least one outer space cap recess aligns with the at least one tool axial recess and a second end of the detent extends into the first detent recess and is biased outwardly into the first detent recess, and
      a second position in which the at least one outer surface cap recess is out of alignment with the at least one tool axial recess and the second end of the detent extends into the second detent recess and is biased outwardly into the second detent recess.

2. The tool assembly of claim 1, wherein the detent comprises a pin, a spring, and a ball, wherein the pin is disposed on one end of the spring and the ball is disposed on the other end of the spring.

3. The tool assembly of claim 1, wherein the at least one outer surface cap recess further comprises a plurality of outer surface cap recesses, and wherein the number of outer surface recesses is equal to the number of tool axial recesses.

4. The tool assembly of claim 1, further comprising a driver defining a driver bore, the driver bore including at least one inwardly depending rib that is slidably received by the at least one tool axial recess.

5. The tool assembly of claim 4, wherein a number of inwardly depending ribs is equal to a number of tool axial recesses.

6. The tool assembly of claim 1, wherein the cap is rotatably secured to the tool by a ring.

7. The tool assembly of claim 1, the cap comprising knurling formed on an outer surface thereon.

8. The tool assembly of claim 1, wherein the first working end defines a polygonal opening therein for engaging a work piece.

9. The tool assembly of claim 2, wherein the ball is disposed at a first end of the bore and the pin is disposed such that the pin extends out of a second end of the bore, and the spring is disposed between the ball and the pin within the bore.

10. The tool assembly of claim 6, wherein the cap includes an opening, and wherein the ring is received within a groove formed in a wall of the opening.

11. A tool assembly, comprising:
   a. a tool having,
      a first working end,
      an opposite second end,
      a central axis therebetween,
      at least one axial recess formed on an outer surface of the tool, and
      a bore formed in the opposite second end transverse to the central axis;
   b. a cap rotatably received on the opposite second end, the cap comprising at least one recess formed on an outer surface thereon, a cap bottom surface recess formed in a bottom surface of the cap facing the tool, a first detent recess formed in an inner wall of the cap, and a second detent recess formed in the inner wall of the cap; and
   c. a detent partially disposed within the bore with a first end of the detent extending into the cap bottom surface recess;
   wherein the cap is rotatable between
      a first position in which the at least one outer surface cap recess aligns with the at least one tool axial recess and a second end of the detent extends into the first detent recess and is biased outwardly into first detent recess, and
      a second position in which the at least one outer space cap recess is out of alignment with the at least one tool axial recess and the second end of the detent extends into the second detent recess and is biased outwardly into the second detent recess;
   wherein the first working end defines a polygonal opening therein for engaging a work piece;
   wherein the tool assembly further comprises a driver defining a driver bore, the driver bore including at least one inwardly depending rib that is slidably received by the at least one tool axial recess.

* * * * *